Oct. 1, 1968   C. H. YOUNG   3,403,936
COLLAPSIBLE AND EXTENDABLE STANDARD
Filed Jan. 16, 1967
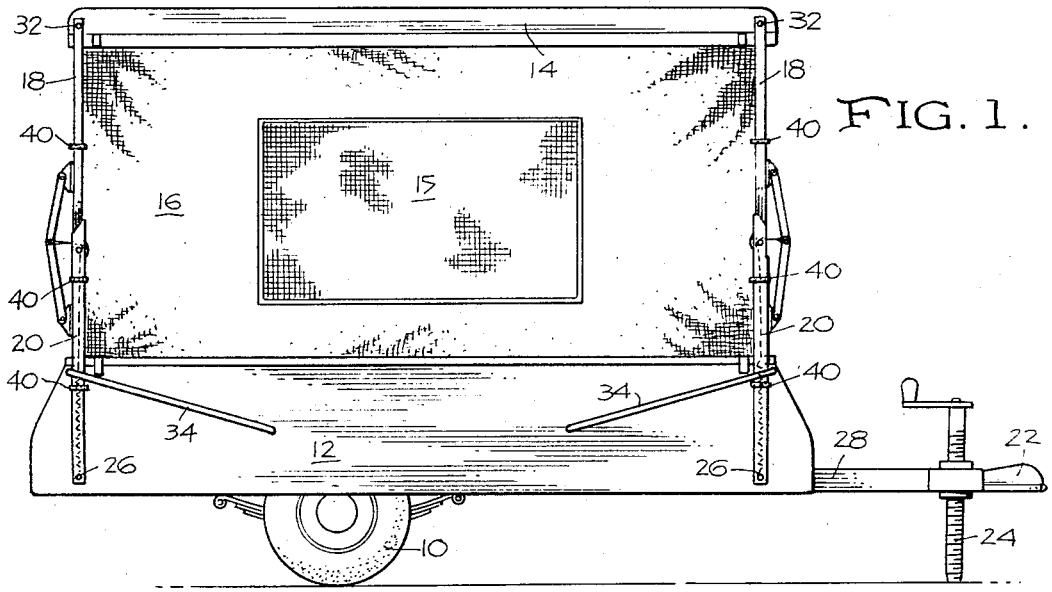
FIG. 1.
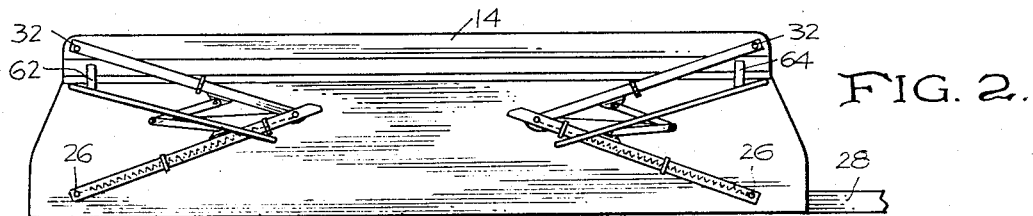
FIG. 2.
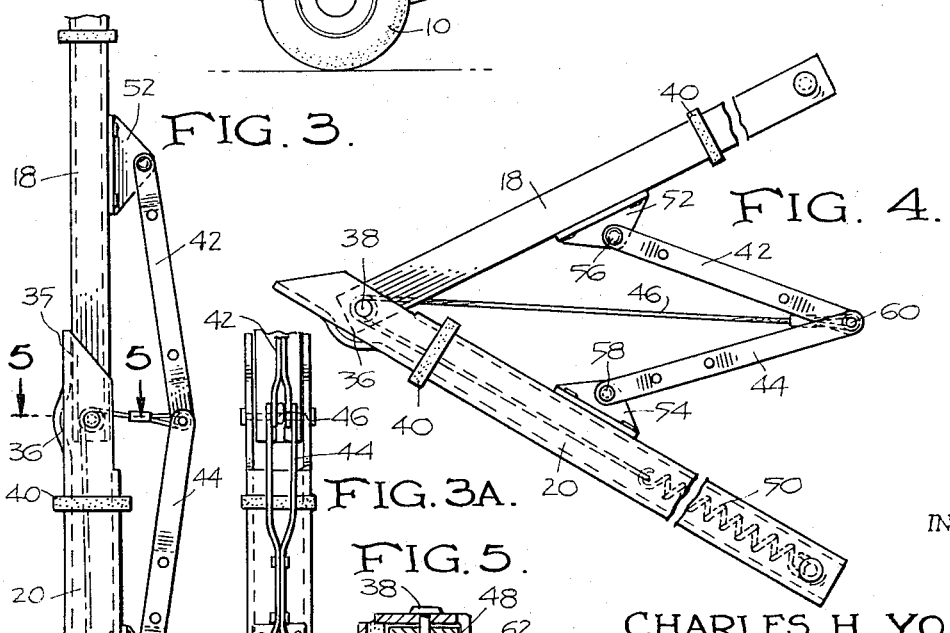
FIG. 3.
FIG. 4.
FIG. 3A.
FIG. 5.
INVENTOR
CHARLES H. YOUNG
BY *William W. Stokes*
ATTORNEY United States Patent Office 3,403,936
Patented Oct. 1, 1968

3,403,936
COLLAPSIBLE AND EXTENDABLE STANDARD
Charles H. Young, 3301 Phillips St.,
Elkhart, Ind. 46514
Filed Jan. 16, 1967, Ser. No. 609,576
8 Claims. (Cl. 296—27)

ABSTRACT OF THE DISCLOSURE

A standard comprising two pivotally joined hollow sections urged into extended position by tension applied by means of a cable attached at one end to a spring within one of the standard sections, running over a pulley at the pivot of the two standard sections and attached at its other end to the pivotal junction of a pair of arms respectively, pivotally attached to a section of the standard.

This invention relates to support means and particularly support means which may be collapsed and extended.

More particularly, this invention relates to support means which are held in the extended position without necessity of locking and which may be collapsed or extended quickly and easily.

Still more particularly the invention relates to collapsible and extendable support means which have utility for vehicles and the like designed with roof members which may be raised and lowered to increase or decrease headroom.

With respect to vehicles represented by trailers, particularly camping trailers designed for periodic use, it has been found that a design which permits the roof of the camper to be lowered during towing is very desirable in order to lower wind resistance, improve roadability, stability and the like. After being towed to the camping area in the lowered position, it is desirable that the headroom necessary for occupancy be quickly and easily increased. This is accomplished by elevating the roof member and supporting it in the elevated position by means of standards.

Collapsible and extendable standards suitable for this purpose are known in the art. U.S. Pat. 3,184,261 discloses such a standard. The present invention represents an improved and superior version of the standards as known in the prior art as shown in the above mentioned patent. The improvement resides in the increased ease and celerity with which the device of this invention can be collapsed for travel and extended for use in camping.

The improvement is accomplished by the spring mechanism which tends to keep the standard in the extended position. Tension of the spring is selected so that only a slight downward pressure together with the downward force contributed by the weight of the roof is sufficient to collapse the standards and lower the roof into travelling position. The roof is held in this position by means of locks which hold the roof to the trailer.

When the roof is to be raised only a slight force is required to lift the roof into position because of the force of the spring tension device tending to urge the standards into their extended positions. Consequently, the roof can be easily raised and lowered by two persons, and only one if necessary, because the need to physically lift the roof to the raised position has been eliminated by the spring tension device.

Briefly stated, the present invention is directed to a collapsible and extendable support means comprising an upper and a lower support member which are pivotally joined. One end of a pair of arms are pivotally joined to the respective support members; the opposite ends of the arms are pivotally joined together. A tension urging the standard into the extended position is applied by means of an expansion spring contained in one of the support members, and a cable which is connected at one end to the spring runs over a pulley at the pivot point of the support members, and is attached at its other end to the pivot point of the pair of arms.

The invention will be more clearly described by reference to the drawings in which:

FIGURE 1 represents a side view of a vehicle with the roof member elevated and showing two of the support members of the invention in their extended position.

FIGURE 2 is a side view of the same vehicle with the roof member collapsed and showing two of the support members in their collapsed position.

FIGURE 3 represents a detailed view of the support members in their extended position as shown in FIGURE 1.

FIGURE 3A represents a detailed view of the support members shown in FIGURE 3 but from the front of the support member.

FIGURE 4 represents a detailed view of the support members in their collapsed position as shown in FIGURE 2.

FIGURE 5 is a cross-sectional view taken along the line 5—5 of FIGURE 3.

Reference numeral 12 designates a body portion of a camper trailer having an extendable roof member 14, wheels 10, a bottom frame 28, a towing device 22 and a support mechanism 24. A canvas or other fabric material 16 furnishes the side walls of the extended trailer which may be fitted with a window of gauze material shown at 15.

The supporting members of the roof or standards comprise an upper support member 18 and a lower support member 20 which are held together with a pivot pin 38. As shown, the support members are made of square channel. The upper support member 18 is of smaller dimensions and fits within the sleeve portion 35 in the channel of the large lower support member 20. The brackets 52 and 54 are mounted on the upper and lower support members respectively. One end of each of the arms 42 and 44 are attached to the brackets 52 and 54 with pivot pins at 56 and 58 respectively. The opposite ends of the arms are pivotally attached at 60.

An expansion spring 50 is fixed at its lower end within the lower support member 20. A cable 46 is attached to the upper end of the spring runs over a pulley 48 mounted on the pivot pin 38. The opposite end of the cable is fastened to the pivot 60. A slot 62 is provided in the upper support member 18 to accommodate the cable 46.

The tension provided by the cable/spring arrangement urges the pivoting arms toward upper and lower support members thus tending to keep them in the extended position. The support members are kept from movement beyond the upright or extended position by means of the sleeve portion 35 of the lower support member 20 which is formed by cutting away a portion of only the front face of the square channel. The opposite or back face of the channel provides a stop means for the upper support member which pivots on the pivot pin 38 across the side faces of the sleeve 35. A recess 36 is provided in the lower support member to allow free movement of the two support members into the collapsed position. The two support members are thus limited in their pivotal motion relative to each other in a single direction and in an angle ranging from substantially 180° to an acute angle.

Four of the described standards are pivotally attached to the roof member 14 at 32 and to the body portion 12 at 26. Rubber grommet rings 40 surround each standard to cushion the standard when either in collapsed or extended relation. Guide members 34 prevent lateral displacement of the standards during either the collapsing or extending operation.

To collapse the support means only a slight downward pull on the roof member 14 is required. The roof member is held in the collapsed position by the lock 64. To raise the roof and extend the standards the locks are opened and a slight upward force is applied to the roof member. Tension in the spring is carefully selected and related to the weight of the roof so that only minimal effort is required to raise or lower the roof.

The collapsible standard of this invention can be made of any support material desired though certain design modifications, which would be apparent to one skilled in the art, would be necessary if the square channel depicted were not used. Tubular, rod or solid square material, for instance, can be used.

Other variations are well within the skill of the art. For instance, rope or chain or the like may be used instead of the cable disclosed in the tension means.

The tension means is specifically described as a spring and a cable connecting the spring and the pivot point of the arm means. Other tension means can be used such as a spring or several springs operating between the support members and the arm members.

Having specifically described the invention, it will be understood that other embodiments will occur to those skilled in the art without departing from the spirit of the present invention.

I claim:

1. A collapsible and extendable standard which comprises a pivotally joined upper support member and lower support member, a first arm member pivotally joined at one of its ends to said upper support member, a second arm member pivotally joined at one of its ends to said lower support member, the opposite ends of said arms being pivotally joined together, and tension means connecting said arm members and said pivotally joined support members, said tension means comprising a pulley, a cable and a spring in interconnective relationship.

2. The standard of claim 1 including a stop means to limit pivotal motion of the support members relative to each other beyond their fully extended position.

3. The standard of claim 1 including a stop means to limit pivotal motion of the support members relative to each other beyond their fully extended position.

4. A collapsible and extendable standard which comprises a pair of support members, the first of said support members having a sleeve portion, the second of said support members being pivotally mounted within said sleeve portion of said first support member such that said support members are capable of pivotal motion relative to each in a single direction and in an angle ranging from substantially 180° to an acute angle, a first arm member pivotally attached to one of said support members, a second arm member pivotally attached to the other of said support members, the opposite ends of said two arms being pivotally attached together, and tension means comprising a spring and cable attached at its first end to said spring, running over a pulley and attached at second end to said arms.

5. The standard of claim 4 wherein the sleeve portion of said first support member includes a recess.

6. The standard of claim 5 wherein the support members are hollow and wherein said spring is fixed within one of said support members.

7. A vehicle having a body and a roof attached to said body by a series of collapsible and extensible standards, said standards being pivotally attached at their upper ends to said roof and at their lower ends to said body, each of said standards comprising an upper support member and a lower support member, said upper support member and said lower support member being pivotally joined together at a first pivot point, a first arm pivotally joined at one of its ends to said upper support member, a second arm pivotally joined at one of its ends to said lower support member at a second pivot point, the opposite ends of said arms being pivotally joined together, and tension means connecting the pivot points of said two arm members and said support members.

8. The vehicle of claim 7 wherein said tension means comprises a spring member.

References Cited

UNITED STATES PATENTS 3,048,438   8/1962   Koch _____ 296—27

PHILIP GOODMAN, *Primary Examiner.*